United States Patent [19]

Clarke

[11] Patent Number: 5,123,503
[45] Date of Patent: Jun. 23, 1992

[54] COMPRESSIBLE ROLLER FOR LOADABLE EQUIPMENT

[76] Inventor: James B. Clarke, 120 Shepherds Hill, Harold Wood, Essex RM3 ONJ, England

[21] Appl. No.: 659,349

[22] PCT Filed: Aug. 21, 1989

[86] PCT No.: PCT/GB89/00970
§ 371 Date: Feb. 19, 1991
§ 102(e) Date: Feb. 19, 1991

[87] PCT Pub. No.: WO90/02241
PCT Pub. Date: Mar. 8, 1990

[30] Foreign Application Priority Data

Aug. 23, 1988 [GB] United Kingdom ............ 8819952

[51] Int. Cl.⁵ ............................................. E06C 7/48
[52] U.S. Cl. ................................. 182/107; 182/129; 16/45
[58] Field of Search ............ 182/107, 108, 129, 206; 16/45

[56] References Cited

U.S. PATENT DOCUMENTS

| | | | |
|---|---|---|---|
| 1,606,198 | 11/1926 | Werk | 182/107 |
| 2,267,403 | 12/1941 | Herold | 16/45 |
| 2,560,036 | 7/1951 | Diehl | 16/45 |
| 3,183,544 | 5/1965 | Bailey | 16/45 |

Primary Examiner—Reinaldo P. Machado
Attorney, Agent, or Firm—Kokjer, Kircher, Bowman & Johnson

[57] ABSTRACT

A roller device (7) for equipment such as a ladder (5) has a rigid core (14) with an axle (17), and a surrounding more compressible rubber portion (8,9) circumferentially spaced portions of which are more readily compressible than adjacent portions so that the device will roll easily when not under load, but less easily when under load.

13 Claims, 1 Drawing Sheet

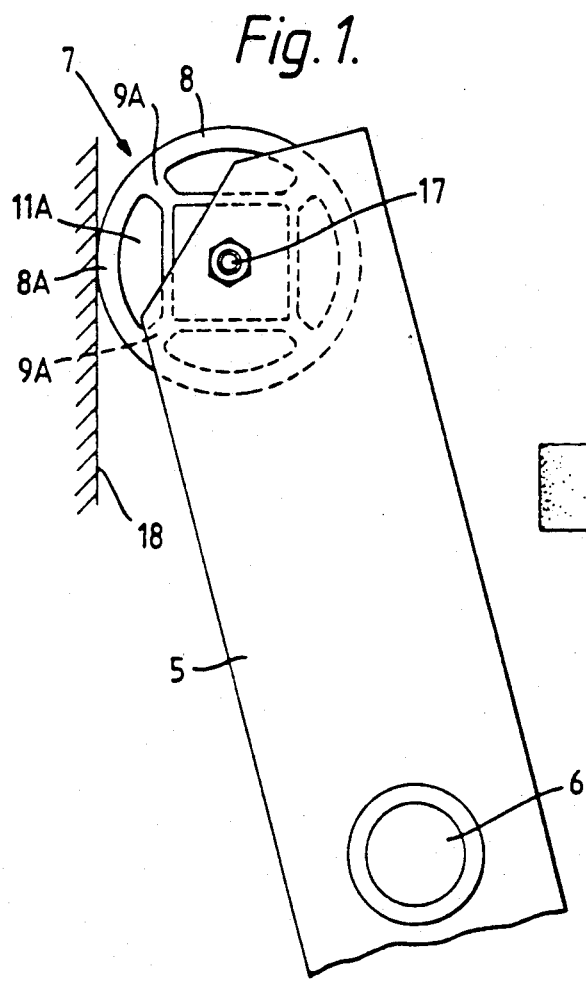
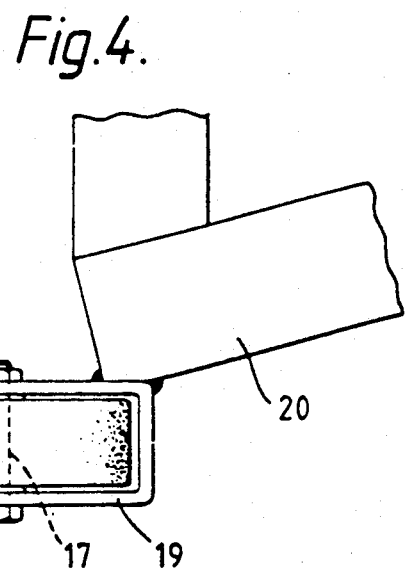
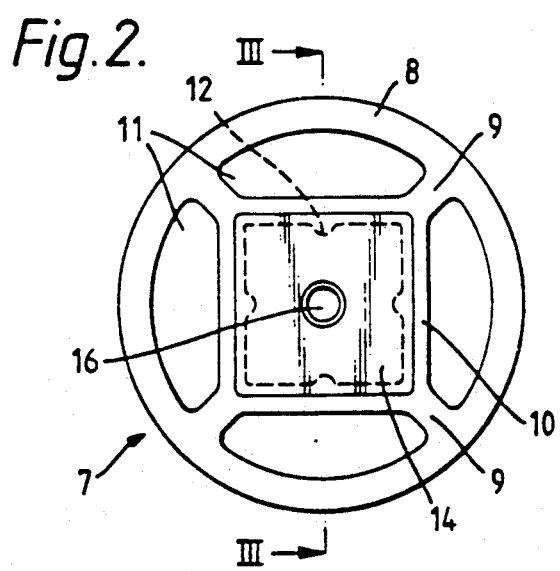
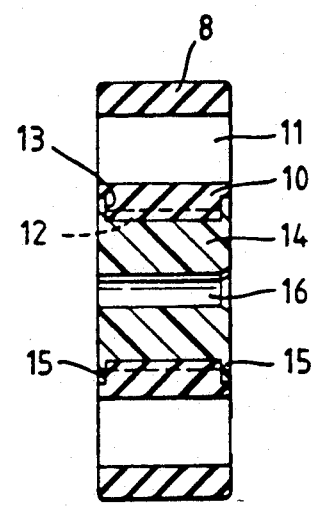

COMPRESSIBLE ROLLER FOR LOADABLE EQUIPMENT

Rollers fitted to loadable equipment, such as ladders, are commonly used to aid the guidance of the equipment over a supporting surface, such as a floor or a wall surface. Such rollers are unsatisfactory in circumstances where it is required to maintain the equipment in a fixed position when under load, such as for example, when a person stands on a ladder. In this case, the tendency of the upper end of the ladder to roll down the wall surface, presents the potential danger to the ladder user of the ladder slipping out form underneath him.

In accordance with the invention, a device which is fitted, or arranged to be fitted, to loadable equipment, which is occasionally movable over a supporting surface when unloaded, the device comprising at least one roller for rolling over the surface, the roller having portions of different compressibilty around its circumference, whereby when resting under a first, lighter loading against the surface the roller will roll easily over that surface, but when the equipment is under load and the roller is forced under a second, heavier loading against the surface a more compressible portion of the roller can flatten more closely towards the axis of the roller than an adjacent less compressible portion thereby impeding rolling.

The device thereby provides stability to loadable apparatus to which it is fitted by helping to prevent movement of the apparatus over the respective supporting surface when under load and yet aids free movement over the surface when the apparatus is not under load.

Preferably, the different compressibility is provided by a resilient outer cover surrounding a substantially rigid core which comprises one or more angularly spaced radially outer extremities spaced from the roller axis by a greater distance than adjacent portions.

The rigid core may have a periphery with a polygonal configuration defining flats between adjacent pairs of outer extremities; and each more compressible portion of the rollers may comprise an internal void to increase its compressibility. The voids may then be separated by webs, which extend radially outwardly from respective ones of the outer extermities of the core, and which are formed integrally with the outer cover. Adjacent webs can then flex apart, when an intervening peripheral resilient portion is compressed radially inwardly so that the peripheral portion flattens, rather than crumples.

One example of a device constructed in accordance with the present invention, and two possible uses of such device, are illustrated in the accompanying drawings, in which:

FIG. 1 is a side elevation showing the device fitted to the top of the ladder;

FIG. 2 is an elevation of the device alone;

FIG. 3 is a section taken on the line III—III in FIG. 2; and,

FIG. 4 is a plan showing the device fitted to a corner of staging.

FIG. 1 shows a ladder having a stile 5 and a top rung 6. The stile 5 is a hollow section and within its upper end, a corner of which is chamfered, is fitted a roller device 7 according to the invention.

As particularly shown in FIGS. 2 and 3, the device 7 comprises an integral wheel-like rubber moulding comprising an outer cylinder 8, four radial webs 9, and an inner hub 10 of square section, these parts defining four voids 11. Each of the four flats of the hub 10 has, integrally projecting along the mid line of its inner surface, a rib 12 and at each end of the hub has a countersunk recess 13.

Forced into the hub 10 is an integrally moulded substantially rigid plastics core 14, which is complementary in shape to the hub 10, having grooves to receive the ribs 12, and end flanges 15 which are received within the recesses 13. The hub 10 is capable of deforming sufficiently to allow insertion of the core, specifically to accommodate the flange 15 at the leading end of the core as it is inserted. The core 13 also has a central circular passageway 16 to accommodate an axle, such as a screw threaded stud 17, which is used to mount the device rotatably on a support. Thus as shown in FIG. 1, the stud 17 passes through the opposite side walls of the tubular stile 5 and is secured by a nut.

With on one standing on a ladder, the roller adopts a circular configuration as shown in FIG. 1. The small reaction with a wall 18 is resisted by the resilience of the rubber parts 8 and 9. The top of the ladder can then readily be rolled up and down the wall, for example upon extension of the ladder. However, when a person stands on a ladder, the engaging portion 8A of the cylinder 8 between two webs 9A is compressed towards the axis of the roller device. As indicated in FIG. 1, this deformation is assisted by the presence of the void 11A, and by the ability of the webs 9A to splay apart. The roller then has a non-circular periphery and this resists possible rolling of the upper end of the ladder on the wall 18.

FIG. 4 shows an alternative use in which the roller device 7 is mounted in a U-shaped bracket 18 also by means of a stud axle 17, the bracket being welded to a corner of a piece of staging 19. The staging would have a similar roller fitted at another corner, so that in could be rolled, like the ladder, more easily over a wall surface when not under load.

A futher user for the roller device would be as a ground-engaging wheel, fitted to the base of a working tower. Whilst unloaded or slightly lifted, the tower could then be wheeled to a different position, and then immobilised by loading and lowering.

I claim:

1. A device fitted, or arranged to be fitted, to loadable equipment, which is occasionally movable over a supporting surface (18) when unloaded, the device comprising at least one roller (7) for rolling over the surface, the roller having portions of different compressibility around its circumference, whereby when resting under a first, lighter loading against the surface the roller will roll easily over that surface, but when the equipment is under load and the roller is forced under a second, heavier loading against the surface a more compressible portion of the roller can flatten more closely towards the axis of the roller than an adjacent less compressible portion thereby impeding rolling.

2. A device according to claim 1, wherein the different compressibility is provided by a resilient outer cover (8,9,10) surrounding a substantially rigid core (14) which comprises one or more angularly spaced radially outer extremities spaced from the roller axis by a greater distance than adjacent portions.

3. A device according to claim 2, wherein the rigid core (14) has a periphery with a polygonal configuration defining flats between adjacent pairs of outer extremities.

4. A device according to claim 3, wherein the rigid core (14) has a square configuration.

5. A device according to claim 1, wherein each more compressible portion of the roller comprises an internal void (11) to increase its compressibility.

6. A device according to claim 2, wherein each more compressible portion of the roller comprises an internal void (11) to increase its compressibility.

7. A device accroding to claim 6, wherein the voids (11) are separated by webs (9), which extend radially outwardly from the respective ones of the outer extremitites of the core, and which are formed integral with the outer cover.

8. A device according to claim 3, wherein each more compressible portion of the roller comprises an internal void (11) to increase its compressibility.

9. A device according to claim 8, wherein the voids (11) are separated by webs (9), which extend radially outwardly from the respective ones of the outer extremities of the core, and which are formed integral with the outer cover.

10. A device according to claim 4, wherein each more compressible portion of the roller comprises an internal void (11) to increase its compressibility.

11. A device according to claim 10, wherein the voids (11) are separated by webs (9), which extend radially outwardly from the respective ones of the outer extremities of the core, and which are formed integral with the outer cover.

12. A device according to claim 4, wherein each more compressible portion of the roller comprises an internal void (11) to increase its compressibility.

13. A device according to claim 12, wherein the voids (11) are separated by webs (9), which extend radially outwardly from the respective ones of the outer extremities of the core, and which are formed integral with the outer cover.

* * * * *